United States Patent
Iezawa et al.

(10) Patent No.: US 11,855,496 B2
(45) Date of Patent: Dec. 26, 2023

(54) LIFE SPAN PREDICTION OF A MOTOR OR MOTOR DEVICE IN A MOTOR DRIVE SYSTEM

(71) Applicant: Mitsubishi Electric Corporation, Tokyo (JP)

(72) Inventors: Masahiro Iezawa, Tokyo (JP); Kotaro Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 17/126,154

(22) Filed: Dec. 18, 2020

(65) Prior Publication Data

US 2022/0077752 A1 Mar. 10, 2022

(30) Foreign Application Priority Data

Sep. 10, 2020 (JP) ................. 2020-151739

(51) Int. Cl.
*H02K 7/00* (2006.01)
*H02K 11/35* (2016.01)
*B60L 53/20* (2019.01)

(52) U.S. Cl.
CPC ............. *H02K 11/35* (2016.01); *B60L 53/20* (2019.02); *H02K 7/006* (2013.01); *B60L 2240/427* (2013.01); *B60L 2240/429* (2013.01)

(58) Field of Classification Search
CPC ........ H02K 11/35; H02K 7/006; B60L 53/20; B60L 2240/427; B60L 2240/429; B60L 15/007; B60L 2210/42; B60L 2240/421; B60L 2240/547; B60L 15/20; B60L 2260/50; Y02T 10/64; Y02T 10/70; Y02T 10/7072; Y02T 10/72; Y02T 90/14; Y02T 90/16; H02P 6/16; H02P 6/28; H02P 27/085

See application file for complete search history.

(56) References Cited

U.S. PATENT DOCUMENTS

| | | | |
|---|---|---|---|
| 5,995,895 A | * 11/1999 | Watt | B60K 31/0066 56/10.2 G |
| 2017/0117841 A1 | * 4/2017 | Watanabe | G06N 5/045 |
| 2019/0199270 A1 | * 6/2019 | Oba | H02P 27/06 |

FOREIGN PATENT DOCUMENTS

| | | | |
|---|---|---|---|
| CN | 101086518 A | * 12/2007 | ............. B60L 15/20 |
| EP | 3306813 A1 | 4/2018 | |
| JP | 2007-28741 A | 2/2007 | |

(Continued)

OTHER PUBLICATIONS

English Translation JP2016226243 (A) (Year: 2022).*

(Continued)

*Primary Examiner* — Christopher M Koehler
*Assistant Examiner* — Viswanathan Subramanian
(74) *Attorney, Agent, or Firm* — Sughrue Mion, PLLC; Richard C. Turner

(57) ABSTRACT

A motor drive system includes a motor that drives a vehicle so as to travel, a motor control device that includes an inverter and a control device that controls the inverter, and which controls the motor, and a communication electronic control unit connected to the control device, wherein the communication electronic control unit transmits information regarding a drive system of the motor transmitted from the control device to an exterior of the vehicle.

2 Claims, 4 Drawing Sheets

(56) References Cited

FOREIGN PATENT DOCUMENTS

| JP | 2016-129462 A | 7/2016 |
| JP | 6010204 B1 | 10/2016 |
| JP | 2016-226243 A | 12/2016 |
| WO | WO-2016100377 A1 * | 6/2016 |

OTHER PUBLICATIONS

English Translation JP2007028741 (A) (Year: 2022).*
WO2016100377A1 English translation (Year: 2023).*
CN101086518A English translation (Year: 2023).*
Communication dated Sep. 21, 2021 from the Japanese Patent Office in Application No. 2020-151739.

* cited by examiner

LIFE SPAN PREDICTION OF A MOTOR OR MOTOR DEVICE IN A MOTOR DRIVE SYSTEM

BACKGROUND OF THE INVENTION

Field of the Invention

The present application relates to the field of a motor drive system.

Description of the Related Art

An existing motor drive system is such that, as disclosed in, for example, Patent Literature 1, a state of deterioration of a motor or an inverter is inferred from sensor information, and an inverter in an interior of a system that drives the motor is controlled in such a way as to restrict progress of a state of deterioration of the motor drive system, that is, in such a way as to lengthen a lifespan, based on the inferred deterioration information.

Patent Literature 1: JP-A-2016-129462

This kind of motor drive system is such that in a case of a vehicle used for car sharing, a taxi, or the like, operation of the vehicle is managed for each area in which the vehicle is used, and a route and a road environment to which the vehicle is applied do not change greatly, because of which commands to a motor or an inverter regarding torque and rotational speed are operated at practically the same magnitude and frequency. A motor or an inverter is normally controlled with a current and a voltage such that loss is small, and in the case of a shared car or a taxi, acceleration, deceleration, and a traveling speed of the vehicle are determined with priority to a request by a user (a time of arrival at a destination, comfort of travel). Consequently, lengthening the lifespan of the motor or a motor control device simply by easing inverter operating conditions is actually difficult.

Also, an operator of a car sharing or a taxi cannot ascertain a remaining lifespan of the motor or the motor control device, because of which replacement or vehicle allocation based on the lifespan of the motor or the motor control device is difficult.

SUMMARY OF THE INVENTION

The present application has been made to solve the problem and an object of the present application is to provide a motor drive system that enables replacement or vehicle allocation based on a lifespan of a motor or a motor control device.

A motor drive system disclosed in the present application includes a motor that drives a vehicle so as to travel, a motor control device that includes an inverter and a control device that controls the inverter, and which controls the motor, and a communication electronic controller connected to the control device, wherein the communication electronic controller transmits information regarding a system that drives the motor transmitted from the control device to an exterior of the vehicle.

The motor drive system disclosed in the present application enables replacement or vehicle allocation based on a lifespan of a motor or a motor control device.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
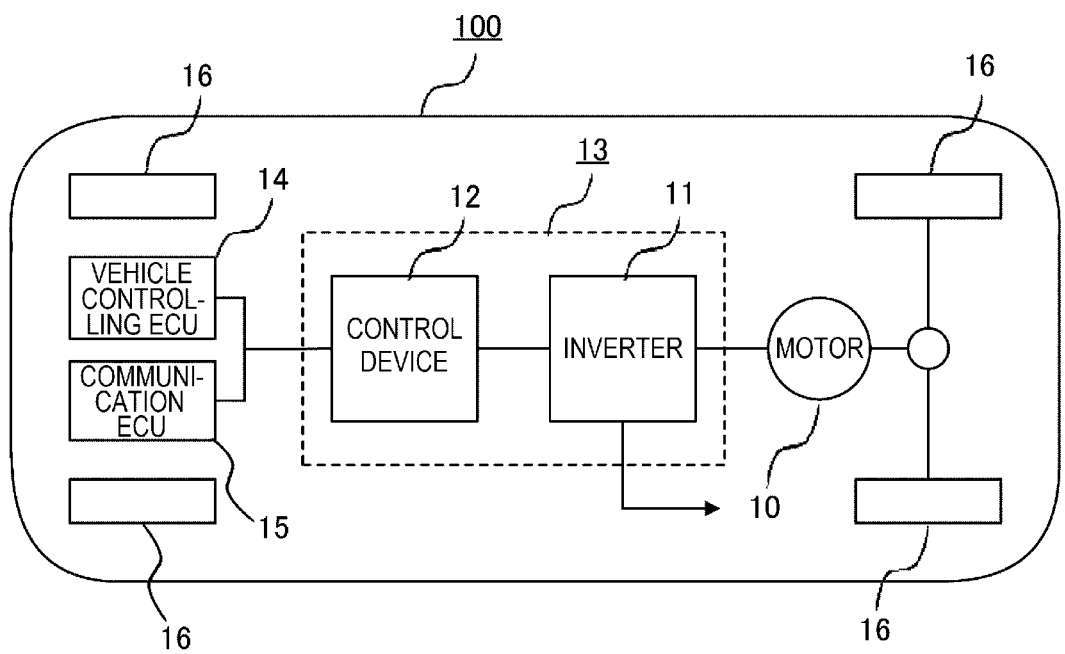
FIG. 1 is a drawing illustrating a schematic configuration of an electric car in which a motor drive system according to a first embodiment is mounted.

Hereafter, an embodiment of a motor drive system according to the present application will be described, using the drawings. Identical reference signs are allotted to identical or corresponding portions in the drawings, and a redundant description will be omitted.

First Embodiment

FIG. 1 is a drawing illustrating a schematic configuration of an electric car in which a motor drive system according to a first embodiment is mounted.

An electric car 100, which is a vehicle, includes a travel driving motor 10, and a motor control device 13 including an inverter 11, which supplies power to the motor 10, and a control device 12. The motor 10 has, for example, a permanent magnet, and is a motor driven by a three-phase alternating current.

Also, a vehicle controlling electronic control unit (hereafter called a vehicle controlling ECU) 14, which carries out integrated control of a whole of the electric car 100 and cooperative control, and a communication electronic control unit (hereafter called a communication ECU) 15, which carries out communication with an exterior of the electric car 100, are included in the electric car 100 as control means on a level higher than the control device 12. Reference sign 16 indicates a wheel of the electric car 100.

Figure 2:
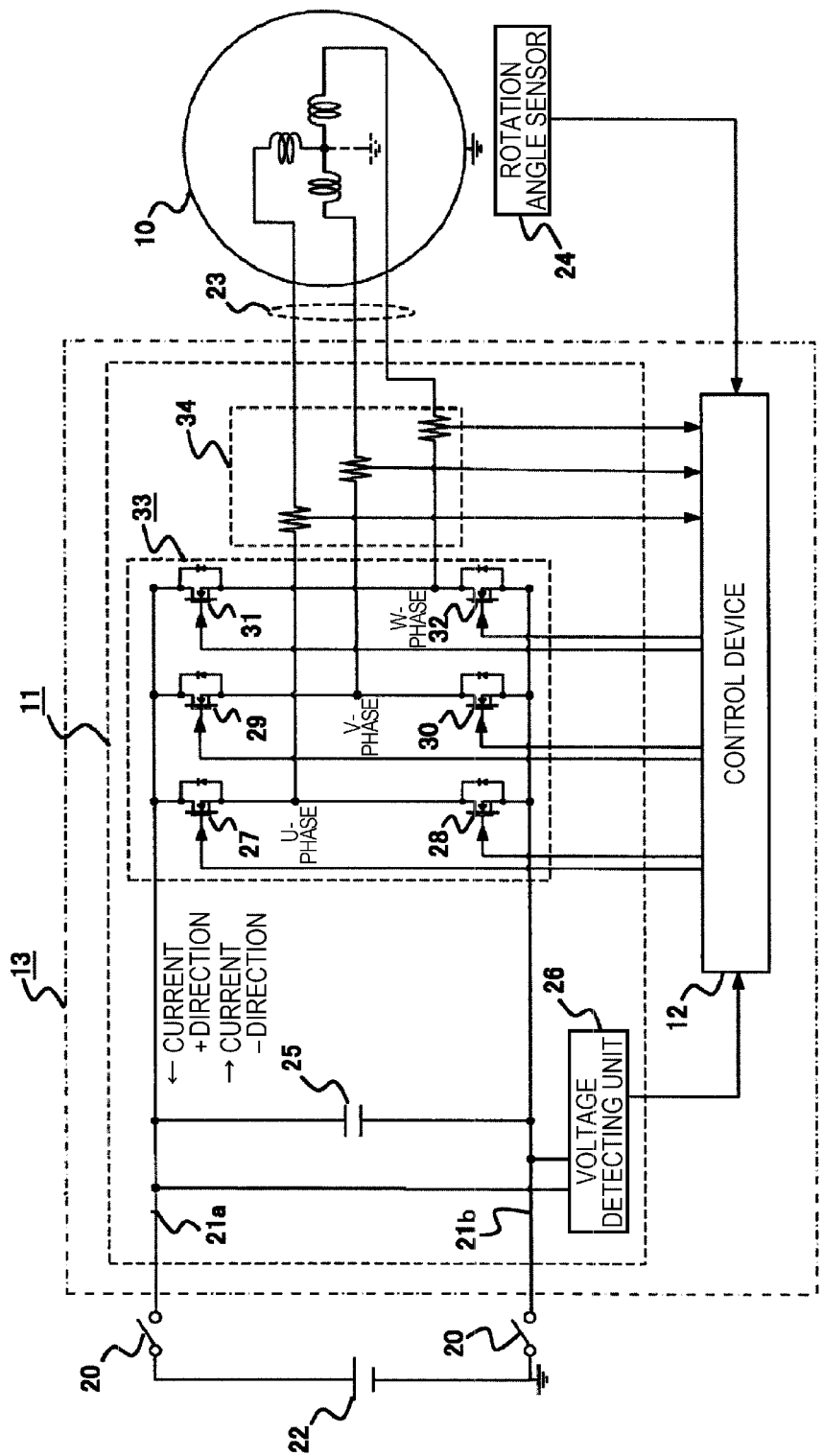
FIG. 2 is a block configuration diagram illustrating the motor drive system according to the first embodiment.

FIG. 2 is a block configuration diagram showing the motor drive system according to the first embodiment mounted in the electric car 100.

In FIG. 2, the motor control device 13 is connected by direct current buses 21a and 21b to a direct current power supply 22 via a power switch 20, and exchanges driving power or regenerative power of the motor 10 with the direct current power supply 22. Also, the motor control device 13 is connected by an alternating current bus 23 to the motor 10, and exchanges driving power or regenerative power with the motor 10. A rotation angle sensor 24 that detects a rotation angle of the motor 10 is provided in the motor 10. The motor 10 is a motor that drives a load so as to rotate, and can regenerate rotational energy of the load as electrical energy, wherein, for example, a permanent magnet three-phase alternating current synchronous motor or a three-phase brushless motor is used.

Also, the motor control device 13 includes the inverter 11 and the control device 12, as previously described. The inverter 11 is configured of a capacitor 25 connected between the direct current buses 21a and 21b on a power supply input side, a voltage detecting unit 26 that detects a direct current bus voltage of the inverter 11, and a multiple of switching elements 27, 28, 29, 30, 31, and 32, and includes a power conversion circuit 33, which carries out power conversion between direct current and alternating current, and a motor current detecting unit 34, which detects a current of the motor 10 flowing through the alternating current bus 23.

The capacitor 25 has a function of restricting direct current bus voltage ripple, a function of causing an alternating current drive capability of the inverter 11 to increase by causing a power supply impedance of the inverter 11 to decrease, a function of absorbing a surge voltage, and the like. Also, the voltage detecting unit 26 divides the direct current bus voltage into a voltage that can be read by the control device 12 using a voltage dividing resistor or the like, and outputs direct current bus voltage information to the control device 12.

The power conversion circuit 33 is a generally well-known conversion circuit wherein six switching elements are full-bridge connected. That is, as shown in FIG. 2, the switching elements 27 and 28, the switching elements 29 and 30, and the switching elements 31 and 32 are connected to each other in series, and connected in parallel to the direct current power supply 22.

Also, an intermediate point of the switching elements 27 and 28 is connected to a U-phase input of the motor 10, an intermediate point of the switching elements 29 and 30 is connected to a V-phase input of the motor 10, and an intermediate point of the switching elements 31 and 32 is connected to a W-phase input of the motor 10.

Herein, the switching elements 27, 29, and 31 on a positive electrode side of the direct current power supply 22, that is, connected to the direct current bus 21a, are called upper level side switching elements, and the switching elements 28, 30, and 32 on a negative electrode side of the direct current power supply 22, that is, connected to the direct current bus 21b, are called lower level side switching elements.

For example, a kind of metal-oxide-semiconductor field-effect transistor (MOSFET), insulated gate bipolar transistor (IGBT), or the like shown in FIG. 2 is used as the switching elements 27, 28, 29, 30, 31, and 32.

A freewheeling diode (FWD) is provided in parallel with the MOSFET configuring each of the switching elements 27, 28, 29, 30, 31, and 32, with a direction from the negative electrode side of the direct current power supply 22 toward the positive electrode side, that is, a direction from the lower level side switching elements 28, 30, and 32 toward the higher level side switching elements 27, 29, and 31, as a forward direction.

The motor current detecting unit 34 detects a motor current flowing through the alternating current bus 23, and outputs motor current information to the control device 12 by converting current into voltage. FIG. 2 shows a configuration wherein current is detected using a shunt resistor. The motor current detecting unit 34 may be a current sensor in which a Hall element or the like is used.

The power switch 20 controls an exchange of power between the direct current power supply 22 and the motor control device 13. Specifically, the power switch 20 is controlled into an opened state by an unshown higher level system when voltage of the direct current power supply 22 becomes equal to or greater than a set value when the motor 10 is carrying out a regenerative operation, when voltage of the direct current power supply 22 becomes equal to or smaller than a set value due to consumption or the like of the direct current power supply 22, when current flowing through the direct current power supply 22 becomes equal to or greater than a set value, when a failure or a collision of the vehicle is detected, or the like. The power switch 20 may be of a configuration controlled by the control device 12.

Also, the rotation angle sensor 24 detects a rotor rotation angle of the motor 10 using a resolver, an encoder, or the like. A rotor rotation angle detected by the rotation angle sensor 24 is output to the control device 12. A rotor rotation angle $\theta m$ is converted into an electrical angle $\theta e$ based on a number of polar pairs of the permanent magnet of the motor 10.

The control device 12 governs control of the whole of the motor control device 13, and is configured of a microcontroller, a drive circuit, or the like.

Figure 3:
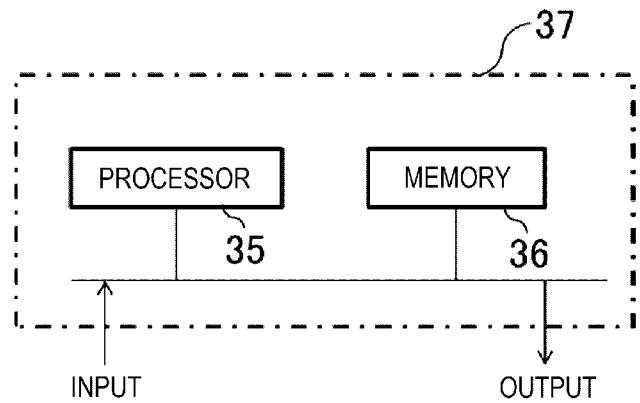
FIG. 3 is a configuration drawing showing a case wherein a control device used in the motor drive system according to the first embodiment is realized by a processing circuit including a processor and a memory.

FIG. 3 is a configuration drawing showing a case wherein the control device 12 is realized by a processing circuit 37 including a processor 35 and a memory 36. When the processing circuit 37 is the processor 35, a function of each unit of the control device 12 is realized by software, firmware, or a combination of software and firmware. The software and the firmware are described as programs, and are stored in the memory 36. The processor 35 realizes the function of each unit by reading and executing a program stored in the memory 36. That is, the control device 12 includes the memory 36 for storing programs such that, when executed by the processing circuit 37, each of the heretofore described controls is resultantly executed.

The programs can also be said to be programs that cause a computer to execute a procedure or a method of each of the heretofore described units. Herein, a non-volatile or a volatile semiconductor memory, such as a random access memory (RAM), a read-only memory (ROM), a flash memory, an erasable programmable read-only memory (EPROM), or an electrically erasable programmable read-only memory (EEPROM) is applicable as the memory 36. Also, a magnetic disk, a flexible disk, an optical disk, a compact disc, a minidisc, a DVD, or the like, is also applicable as the memory 36.

The functions of the heretofore described units may be such that one portion is realized by dedicated hardware, and one portion is realized by software or firmware.

In this way, a processing circuit can realize the function of each of the heretofore described units using hardware, software, firmware, or a combination thereof.

Figure 4:
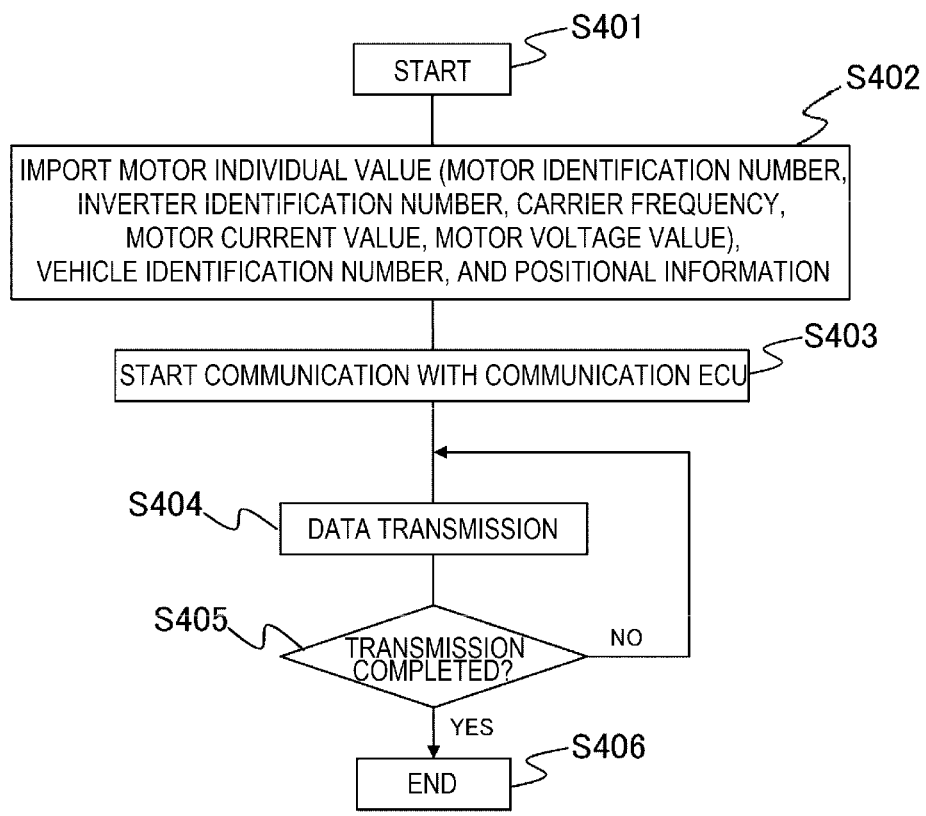
FIG. 4 is a flowchart showing an example of a communication routine of transmitting data from the control device used in the motor drive system according to the first embodiment to a communication electronic control unit.

FIG. 4 is a flowchart showing an example of a communication routine of transmitting data from the control device 12 to the communication ECU 15.

Firstly, a program is started in step S401, and a motor individual value (a motor identification number, an inverter identification number, a carrier frequency, a motor current value, a motor voltage value), which is information regarding a system that drives the motor 10, a vehicle identification number, and positional information are imported in step S402.

Communication with the communication ECU 15 is started in step S403, and the data imported in step S402 are transmitted to the communication ECU 15 in step S404.

Whether the transmission of data to the communication ECU 15 is completed is confirmed in step S405, the program returns to step S404 when the transmission of data is not completed, and when the transmission of data is completed, the program proceeds to step S406, and is ended.

Figure 5:
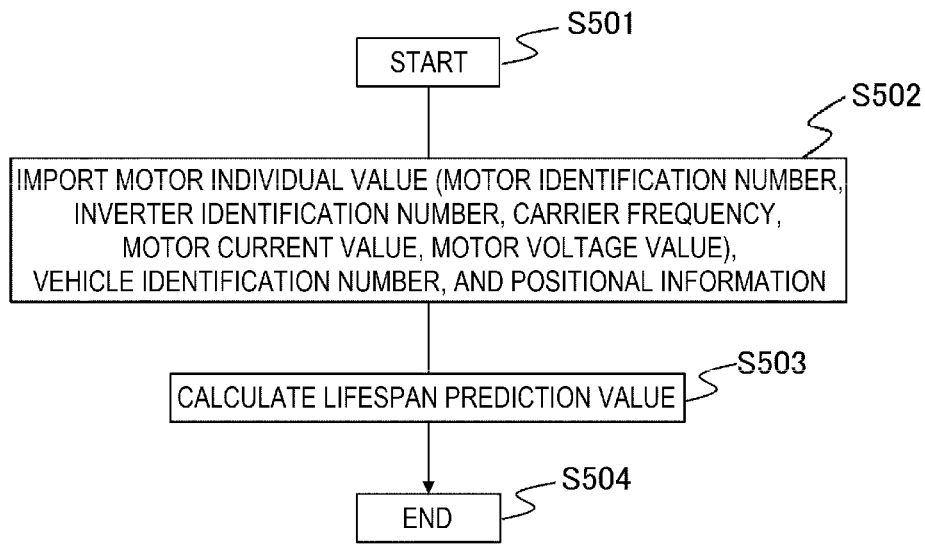
FIG. 5 is a flowchart wherein data transmitted from the control device used in the motor drive system according to the first embodiment are processed by the communication electronic control unit.

FIG. 5 is a flowchart wherein data transmitted from the control device 12 and received by the communication ECU 15 are processed.

Firstly, a program is started in step S501, and a motor individual value (a motor identification number, an inverter identification number, a carrier frequency, a motor current value, a motor voltage value), a vehicle identification number, and positional information are imported in step S502.

In step S503, a lifespan prediction value, which is lifespan prediction information, is calculated based on at least any one of the carrier frequency, the motor current value, and the motor voltage value imported in step S502 and a part characteristic of the inverter 11, or on information wherein a multiple of these are combined, after which the program proceeds to step S504, and is ended. An example of a method of calculating the lifespan prediction value is disclosed in, for example, JP-A-2007-28741, and this method can be used.

Figure 6:
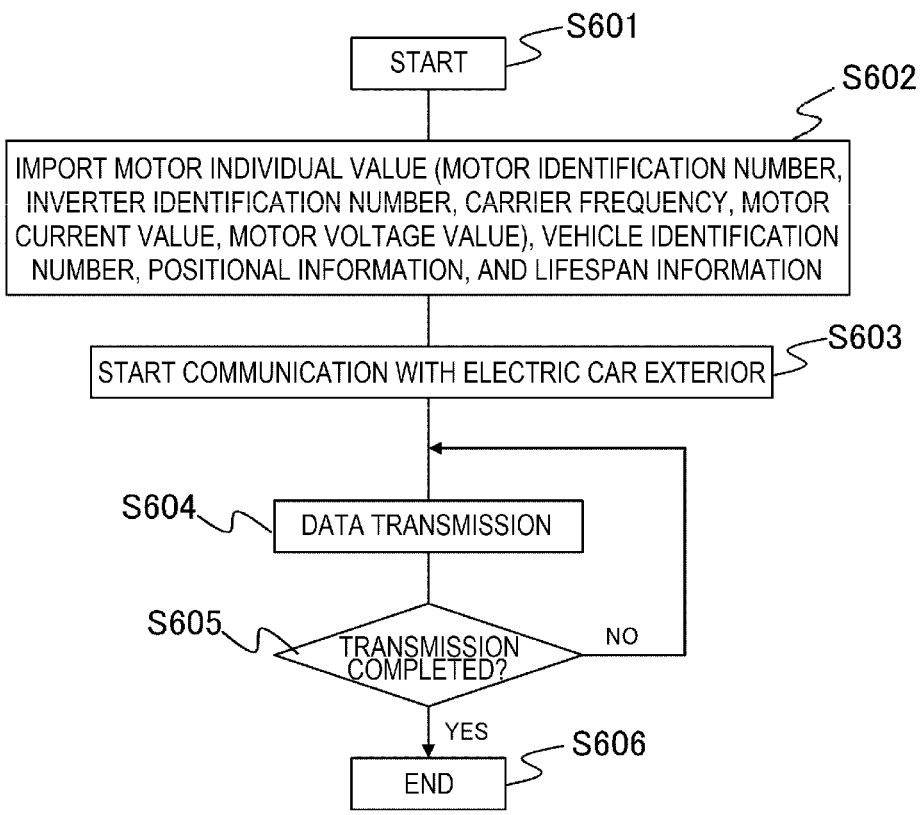
FIG. 6 is a drawing showing an example of a communication flowchart wherein data are transmitted from the communication electronic control unit used in the motor drive system according to the first embodiment to an exterior of an electric car.

FIG. 6 is an example of a communication flowchart wherein data are transmitted from the communication ECU 15 to the exterior of the electric car 100.

Firstly, a program is started in step S601, and a motor individual value (a motor identification number, an inverter identification number, a carrier frequency, a motor current value, a motor voltage value), a vehicle identification number, positional information, and a lifespan prediction value, which is lifespan information, are imported in step S602.

A transmission to the exterior of the electric car 100 is started in step S603, and the data imported in step S602 are transmitted to the exterior of the electric car 100 in step S604.

Whether the transmission to the exterior of the electric car 100 is completed is confirmed in step S605, the program returns to step S604 when the transmission is not completed, and when the transmission is completed, the program proceeds to step S606, and is ended.

According to the motor drive system according to the first embodiment, as heretofore described, the lifespan of the motor 10 or the inverter 11 can be ascertained in the vehicle exterior by communication with the exterior of the electric car 100 being carried out based on information transmitted from the control device 12.

External communication by the communication ECU 15 may be carried out using one of wired communication means such as a CAN (registered trademark), wireless means such as a mobile telephone-oriented network line typified by Bluetooth (registered trademark), Wi-Fi (registered trademark), 4G, 5G, or the like, or communication means routed through a terminal instrument like a smartphone, a personal computer, or a mobile instrument in which external communication means is mounted, or a combination thereof.

Also, the lifespan prediction value may be calculated by a lifespan estimating unit having information learned by machine learning, based on at least any one of the current value, the voltage value, and the carrier frequency of the motor 10 and a part characteristic of the inverter 11, or on information wherein a multiple of these are combined.

By doing as heretofore described, an operator of, for example, a car sharing or a taxi can ascertain the lifespans of a motor and a motor control device in real time using wired or wireless communication means, because of which timing of a motor drive system replacement based on the lifespans of the motor and the motor control device can be determined using the lifespans. Also, by ascertaining a remaining lifespan, a decision regarding an area to which a car is to be allocated, such as whether to use the car in an area with a large number of mountain roads or whether to use the car in an area with a large number of flat roads, can be made with consideration not only to information regarding distance traveled, but also to the topography of an area of use. Because of this, an advantage can be obtained in that an operator of a car sharing, a taxi, or the like can carry out a stable allocation of a vehicle to a client.

Although the present application is described above in terms of an exemplifying embodiment, it should be understood that the various features, aspects, and functionality described in the embodiment are not limited in their applicability to the particular embodiment with which they are described, but instead can be applied, alone or in various combinations, to other embodiments.

It is therefore understood that numerous modifications that have not been exemplified can be devised without departing from the scope of the present application. For example, at least one constituent component may be modified, added, or eliminated.

What is claimed is:

1. A motor drive system, comprising:
    a motor that drives a vehicle so as to travel;
    a motor control device that includes an inverter and a control device that controls the inverter, and which controls the motor; and
    a communication electronic controller connected to the control device, wherein
    the communication electronic controller transmits information regarding a drive system of the motor, the information being lifespan prediction information regarding the motor or the inverter and transmitted from the control device, to an exterior of the vehicle in real time,
    wherein the communication electronic controller transmits a lifespan prediction value included in the lifespan prediction information in real time without comparing the lifespan prediction value to a threshold,
    wherein the lifespan prediction information is calculated based on a part characteristic of the inverter and at least any one of a current value, a voltage value, and a carrier frequency of the motor, and
    wherein information relating to the part characteristic of the inverter and the current value, the voltage value, and the carrier frequency of the motor is calculated from at least any one of a momentary value, a value calculated from map data, an integrated value of the momentary value, and an integrated value of a value calculated from the map data, or from a combination thereof.

2. The motor drive system according to claim 1, wherein the information regarding the drive system further includes at least any one of a vehicle identification number, a motor identification number, an inverter identification number, and positional information, or a combination of a multiple thereof.

* * * * *